(12) United States Patent
Zeghloul et al.

(10) Patent No.: US 12,544,788 B2
(45) Date of Patent: Feb. 10, 2026

(54) METHOD FOR SEPARATING THE COMPONENTS OF A MIXTURE OF FIBERS AND GRANULES BY ELECTROSTATIC NEUTRALIZATION AND SCREENING, AND CORRESPONDING UNIT

(71) Applicants: Compagnie Generale Des Etablissements Michelin, Clermont-Ferrand (FR); CENTRE NATIONAL DE LA RECHERCHE SCIENTIFIQUE, Paris (FR); ECOLE NATIONALE SUPERIEURE DE MECANIQUE ET D'AEROTECHNIQUE, Futuroscope Chasseneuil (FR); UNIVERSITE DE POITIERS, Poitiers (FR)

(72) Inventors: Thami Zeghloul, Clermont-Ferrand (FR); Lucien Dascalescu, Clermont-Ferrand (FR); Karim Medles, Clermont-Ferrand (FR); Thomas Simonelli, Clermont-Ferrand (FR); Christophe Le Clerc, Clermont-Ferrand (FR)

(73) Assignees: COMPAGNIE GENERALE DES ETABLISSEMENTS MICHELIN, Clermont-Ferrand (FR); CENTRE NATIONAL DE LA RECHERCHE SCIENTIFIQUE, Paris (FR); ECOLE NATIONALE SUPERIEURE DE MECANIQUE ET D'AEROTECHNIQUE, Futuroscope Chasseneuil (FR); UNIVERSITE DE POITIERS, Poitiers (FR)

( * ) Notice: Subject to any disclaimer, the term of this patent is extended or adjusted under 35 U.S.C. 154(b) by 0 days.

(21) Appl. No.: 18/710,111

(22) PCT Filed: Nov. 10, 2022

(86) PCT No.: PCT/EP2022/081538
§ 371 (c)(1),
(2) Date: May 14, 2024

(87) PCT Pub. No.: WO2023/083991
PCT Pub. Date: May 19, 2023

(65) Prior Publication Data
US 2025/0010336 A1    Jan. 9, 2025

(30) Foreign Application Priority Data

Nov. 15, 2021  (FR) ..................... 2112032

(51) Int. Cl.
*B07B 1/22* (2006.01)
*B07B 4/06* (2006.01)
*B07B 4/08* (2006.01)

(52) U.S. Cl.
CPC ............... *B07B 1/22* (2013.01); *B07B 4/06* (2013.01); *B07B 4/08* (2013.01); *B07B 2201/04* (2013.01)

(58) Field of Classification Search
CPC .... B07B 1/22; B07B 4/06; B07B 4/08; B07B 2201/04
See application file for complete search history.

(56) References Cited

U.S. PATENT DOCUMENTS 4,119,534 A * 10/1978 Porter ................. B07B 1/22
209/291
5,513,755 A * 5/1996 Heavilon .............. B07B 13/113
209/11

(Continued)

FOREIGN PATENT DOCUMENTS

| CN | 111299118 A | 6/2020 | |
|---|---|---|---|
| EP | 1818111 A2 | 8/2007 | |
| ES | 2549396 A2 * | 10/2015 | ......... B07B 11/06 |
| WO | WO-2015000836 A1 * | 1/2015 | ......... B60C 9/1807 |
| WO | 2020262959 A1 | 12/2020 | |

*Primary Examiner* — Michael McCullough
*Assistant Examiner* — Kalyanavenkateshware Kumar
(74) *Attorney, Agent, or Firm* — Dickinson Wright PLLC

(57) ABSTRACT

A separation method making it possible, from a mixture containing fibers and granules, to separate the fibers from the granules is provided. The method comprises a supply step (Continued)

during which the mixture is brought into a receptacle provided with a screen, a dissociation step which involves carrying out, simultaneously, an agitation sub-step in which mechanical mixing of the mixture contained in the receptacle is performed and a neutralization sub-step in which the mixture being mixed in the receptacle is exposed to bipolar charges in order to neutralize electrostatic charges of the fibers and the granules, followed by a screening step during which the mixture treated in accordance with the dissociation step is passed over the screen in order to retain in the receptacle a first product enriched in fibers while a second product enriched in granules is discharged through the screen.

20 Claims, 3 Drawing Sheets

(56) References Cited

U.S. PATENT DOCUMENTS

| | | |
|---|---|---|
| 5,914,145 A | 6/1999 | Packer |
| 2018/0021816 A1* | 1/2018 | Schenk .................... B07B 1/22 209/238 |
| 2020/0147651 A1* | 5/2020 | Sanchez Rodriguez .................... B03D 1/1468 |
| 2021/0205850 A1 | 7/2021 | Branham et al. |

* cited by examiner

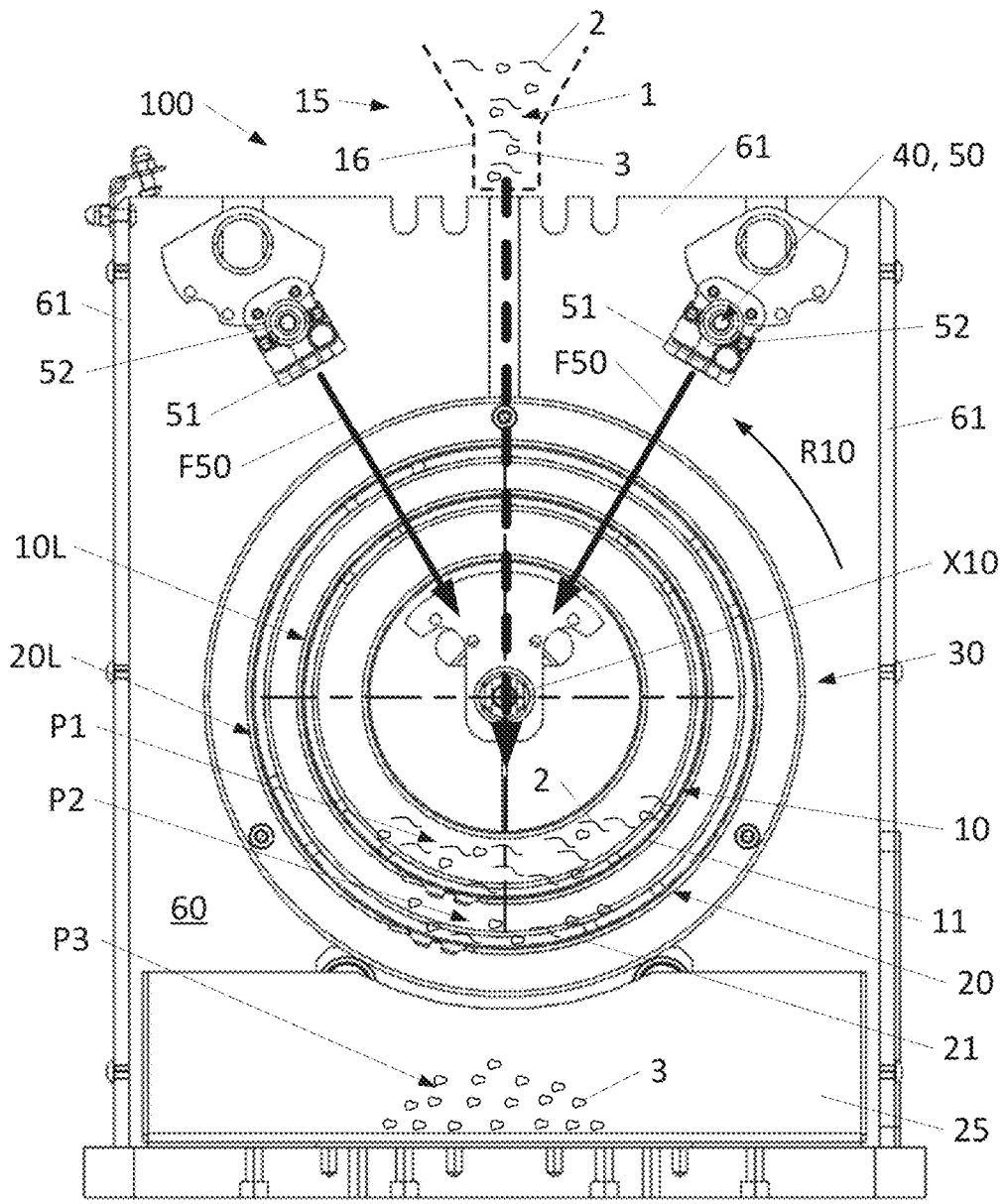
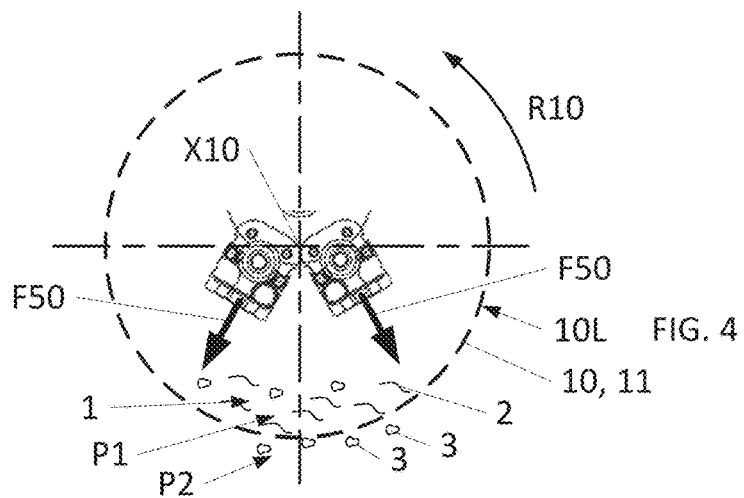
FIG. 3
FIG. 4

METHOD FOR SEPARATING THE COMPONENTS OF A MIXTURE OF FIBERS AND GRANULES BY ELECTROSTATIC NEUTRALIZATION AND SCREENING, AND CORRESPONDING UNIT

CROSS-REFERENCE TO RELATED APPLICATIONS

This U.S. patent application is a national phase entry of PCT Patent Application No. PCT/EP2022/081538 filed Nov. 10, 2022, which claims priority to French Patent Application No. FR2112032 filed Nov. 15, 2021, the entire contents of which are incorporated herein by reference in their entirety.

BACKGROUND

1. Field of the Invention

The present invention relates to the general field of methods for separating the components of a mixture containing fibers and granules, which aim to separately recover said fibers on the one hand and said granules on the other hand.

The present invention is notably applicable in the treatment of industrial waste in the form of a mixture containing fibers and granules, with a view to recycling the materials constituting said fibers and said granules, and more particularly in the treatment of mixtures originating from the grinding of pneumatic tires and which contain textile fibers, in particular polyethylene terephthalate fibers, and granules of rubber-based material.

The present invention is more particularly applicable in the treatment of mixtures in which the components are of millimeter and sub-millimeter size, that is to say containing fibers having a diameter of between 10 µm and 1 mm for a length of between 1 mm and 10 mm, and granules having an equivalent diameter of between 125 µm and 5 mm.

2. Related Art

Many methods are known for recovering fibers made of polymer material from a mixture containing said fibers along with other components.

In particular, wet methods are known in which the mixture is dissolved in a solvent, following which the solution obtained is treated in order to recover the polymer. Such methods are generally quite polluting.

Other wet methods are known for separating the components of a mixture in which the mixture of granules and fibers is dispersed in an aqueous solution which is then subjected to decantation. However, these methods are confined to the treatment of mixtures in which the components have distinctly different densities, one of which is strictly greater than the density of water.

Also known, notably from document EP-2 937 200, are dry separation methods which employ screening of the mixture through a vibrating screen, and preferably several successive screenings through as many vibrating screens, and which use a blast of air from below the screen to convey the fibers and suck them into a hood located above the screen.

Such screening methods are certainly less polluting and consume less energy than wet methods, but they nevertheless generally have unsatisfactory yields, and often only make it possible to obtain refined products of relatively poor quality because many fibers and granules still remain clumped together.

SUMMARY

The objectives underlying the invention therefore aim to overcome the aforementioned drawbacks and propose a novel separation method, and a corresponding novel unit, which significantly improve the efficiency of separation of the fibers and granules, while producing little pollution with a low energy consumption.

The objectives underlying the invention are achieved by means of a separation method making it possible, from a mixture containing fibers and granules, to separate said fibers from said granules, said method comprising for this purpose a supply step (S1), during which the mixture is brought into a receptacle provided with a screen, a dissociation step (S2) which involves carrying out, simultaneously, an agitation sub-step (S201) in which mechanical mixing of the mixture contained in the receptacle is performed and a neutralization sub-step (S202) in which the mixture being mixed in the receptacle is exposed to bipolar charges in order to neutralize electrostatic charges of the fibers and the granules, followed by a screening step (S3) during which the mixture treated in accordance with the dissociation step (S2) is passed over the screen in order to retain in the receptacle a first product resulting from the mixture, this first product having a fiber content greater than that of the mixture, while a second product resulting from the mixture is discharged through the screen, the granule content of this second product being greater than that of the mixture.

Advantageously, the inventors have found that, by combining on the one hand mechanical mixing of the mixture, which makes it possible to overcome adhesion forces such as Van der Waals forces which keep the fibers and the granules clumped together, and on the other hand electrostatic neutralization, which makes it possible, at the same time, to reduce or even eliminate the electrical charges of the fibers and the granules and thus to reduce or even eliminate the electrostatic attraction forces which tend to make the fibers and the granules clump together, the fibers can be efficiently dissociated from the granules within the mixture and, once dissociated from one another, the fibers and the granules are prevented from clumping together again.

In this way, the mixture is perfectly prepared for screening, in that the components of said mixture, namely the fibers and the granules, are already well dissociated from one another when said mixture is presented against the screen so as to be subjected to the action of said screen, which makes said screening particularly effective and selective, since each individual component (fiber or granule) thus dissociated from the components neighboring it is exposed in its own right to the mesh of the screen, without remaining attached to a neighboring component which could potentially prevent said component from passing through the screen.

Preferably, the exposure of the mixture to the screen occurs in a region of space, in this case in a portion of the receptacle, which is exposed to the joint actions of mechanical agitation and electrostatic neutralization, such that the mixture which is in contact with the screen, and more particularly the various components of said mixture, namely the fibers and granules which it is desired to separate, are and remain permanently, including at the moment when screening takes place, subject to the dissociation effect which results from this agitation and this neutralization.

Note moreover that it is advantageously possible, as will be described in detail below, to improve and enhance the dissociation effect obtained by the mixing and neutralization actions carried out in accordance with the method according to the invention by supplementing them with a blowing action, which helps to aerate the mixture and diffuse the bipolar charges within said mixture.

In any case, the method proposed by the invention preferably constitutes a dry method, which makes it possible to obtain effective separation of the components of the mixture without involving any solvent or any immersion of the mixture in any aqueous solution.

BRIEF DESCRIPTION OF THE DRAWINGS

Further subjects, features and advantages of the invention will become apparent in more detail from reading the following description and with the aid of the appended drawings, which are provided purely by way of illustration and without limitation and in which:

FIG. 3 is a face-on view of the section of FIG. 2.

FIG. 4 is a schematic view, in a section plane perpendicular to the axis of rotation of the screening drum(s), of a variant embodiment of the unit of FIGS. 1 to 3 in which ionizing blower bars are located inside a screening drum.

DETAILED DESCRIPTION OF EXAMPLE EMBODIMENTS

Figure 1:
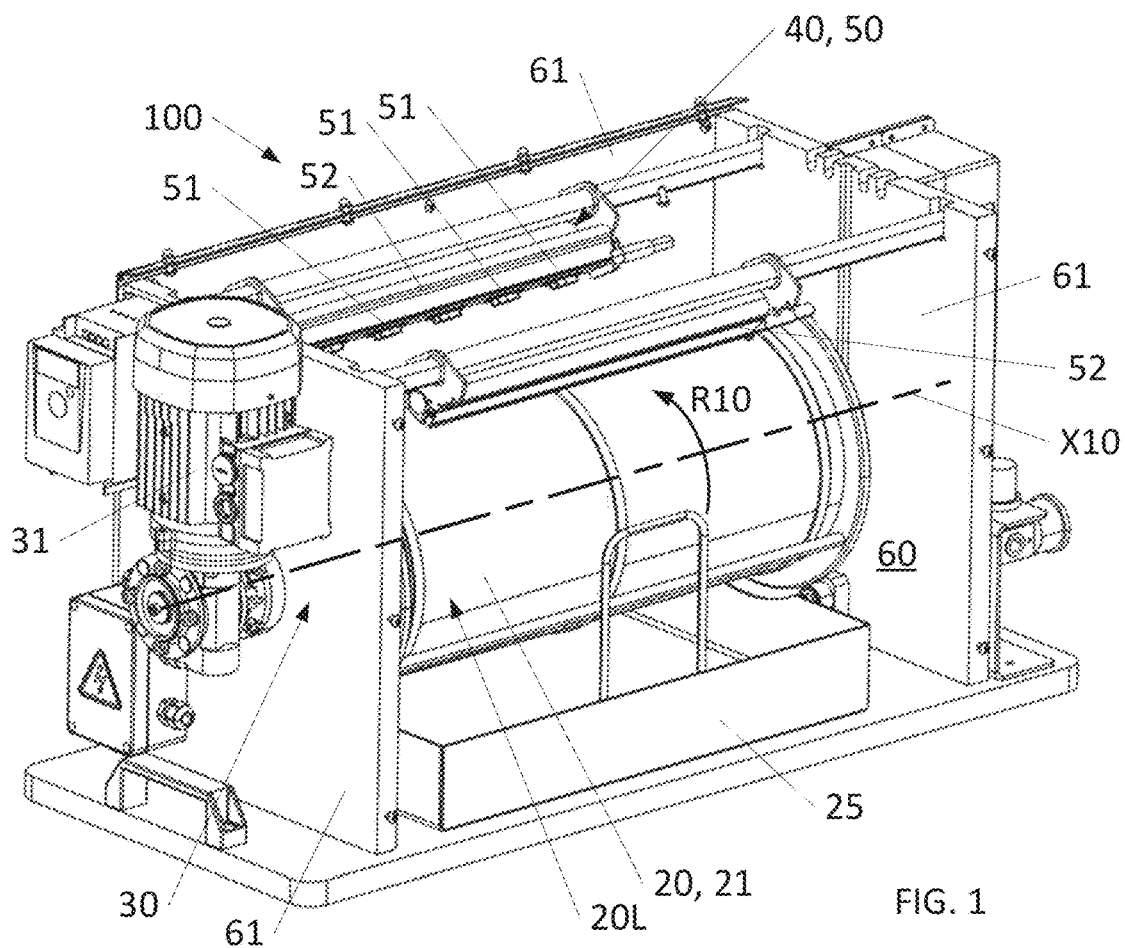
FIG. 1 shows, in a perspective view with a top wall and a side wall removed, an example of a unit for implementing a method according to the invention and comprising for this purpose cylindrical screening drums mounted to rotate about a central axis which is substantially horizontal, along with ionizing blower bars which are located outside of said screening drums and the flow from which is directed toward the interior of said screening drums.

The present invention relates to a separation method making it possible, from a mixture 1 containing fibers 2 and granules 3, to separate said fibers 2 from said granules 3 (or, seen reciprocally, to separate the granules 3 from the fibers 2).

The invention also relates, naturally, to a unit 100 making it possible to implement such a method.

The material constituting the fibers 2 will be different from the material constituting the granules 3, and, more particularly, the materials constituting respectively the fibers 2 on the one hand, and the granules 3 on the other hand, will be such that the fibers 2 and the granules 3 may each carry an electrostatic charge, but of opposite sign.

Preferably, the method according to the invention will be designed to be able to separate fibers 2, contained in the mixture 1, which have a length which is between 1 mm and 10 mm, and a largest transverse dimension which is between 10 µm and 1 mm. "Largest transverse dimension" means the largest dimension out of the dimensions of the section of the fiber, considered perpendicular to the length of the fiber. In the case of a fiber 2 which has a cylindrical shape with a circular base, the largest transverse dimension therefore corresponds to the diameter of the circular base, that is to say the diameter of the section of said fiber 2.

The fibers 2 will have a thin and elongate shape, preferably substantially cylindrical.

More preferably, the fibers 2 will have a dimension, referred to as the length, that is clearly greater than the other two dimensions, referred to as the transverse dimensions, and more specifically having a length at least 5 times, preferably at least 10 times, at least 20 times, or at least 50 times or even 100 times greater than the largest of these transverse dimensions, i.e. typically than the diameter of the fiber in question.

The fibers 2 may be made of a natural or synthetic textile material, and more preferably of a polymer or a combination of polymers from among: polyethylene terephthalate (PET), polyethylene (PE), polypropylene (PP), polyvinyl chloride (PVC) and polystyrene (PS).

Preferably, the method will be designed to separate the aforementioned fibers 2 from the granules 3 in a mixture in which said fibers 2 are mixed with, or even clumped together with, granules 3 having an equivalent diameter between 125 µm and 5 mm.

The term "equivalent diameter" denotes the diameter that a dummy sphere, occupying the same volume as the volume occupied by the granule 3 in question, would have.

Furthermore, the granules 3 will preferably have a shape factor equal to or less than 2. The term "shape factor" denotes the ratio between, on the one hand, the maximum Feret diameter, i.e. the maximum distance, observable for the granule in question, between two straight lines that are parallel to each other and tangent, respectively, to opposite sides of said granule, and, on the other hand, the minimum Feret diameter, i.e. the minimum distance, observable for the granule in question, between two straight lines that are parallel to each other and tangent, respectively, to opposite sides of said granule. This shape factor provides a good indication of the slenderness of the granules 3. By way of indication, a shape factor equal to 1 corresponds to a sphere, and a shape factor equal to the square root of 2 corresponds to a cube.

Preferably, the granules 3 will consist of a rubber-based material.

Thus, the method preferably applies to a mixture 1 which contains textile fibers 2, preferably made of polyethylene terephthalate, and granules 3 made of a rubber-based material.

More particularly, the invention may thus be applied to a method for recycling a pneumatic tire, said recycling method comprising a grinding step, during which at least a portion of the pneumatic tire in question is reduced to a mixture 1 containing textile fibres 2 and granules 3 made of a rubber-based material, and then a sorting step, during which a separation method according to any one of the possibilities envisaged by the invention is applied to said mixture 1.

To be specific, as is known, worn pneumatic tires contain both elastic structural elements, based on vulcanized rubber, and fibrous reinforcing elements. Shredding such tires thus makes it possible to obtain mixtures rich in both rubber granules and fibers, which it is useful to be able to separate so as to be able to recycle the corresponding raw materials.

In all cases, whatever the origin of the mixture and the purpose of the process in which the separation method according to the invention takes place, said separation method according to the invention first of all comprises a supply step (S1), during which the mixture 1 is brought into a receptacle 10 provided with a screen 11.

The receptacle 10 and the screen 11 may take any appropriate shape. For example, the screen could be formed by a flat plate, provided with edges delimiting the receptacle.

However, according to a preferred implementation variant, and as can be seen clearly in FIGS. 1, 2, 3 and 5, the receptacle 10 will have a cylindrical shape, preferably with a circular base, and the screen 11 will form all or part of the curved side wall 10L of said cylindrical shape. Such a receptacle 10 will thus form a screening drum. For convenience of description, in the text below, the receptacle 10 may be equated to a screening drum, the same reference 10 being used to designate the receptacle or the screening drum indiscriminately.

The screen 11 will preferably be made of an electrically insulating material, that is to say having an electrical resistivity greater than or equal to $10^{10}$ Ω·m at a temperature of 300 Kelvin, in order not to hinder the neutralization by the bipolar charges. In addition, the material constituting the screen 11 will be sufficiently rigid to prevent the screen 11 from deforming under the weight and movements of the mixture 1.

Figure 2:
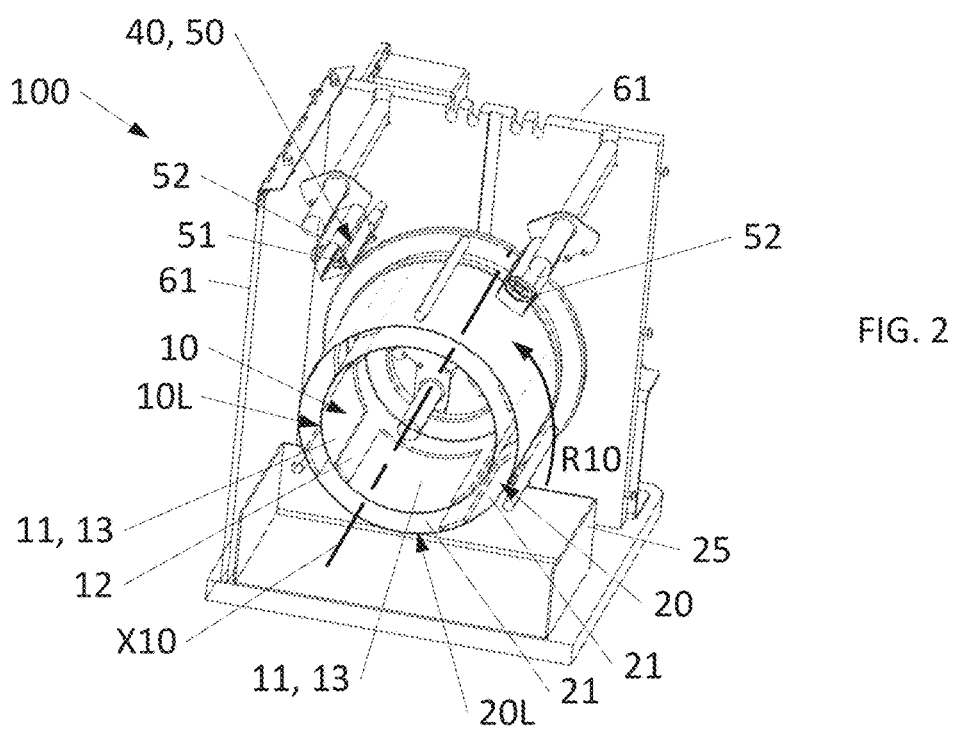
FIG. 2 is a perspective view in section of the unit of FIG. 1, in a section plane which is normal to the axis of rotation of the screening drums.
Figure 5:
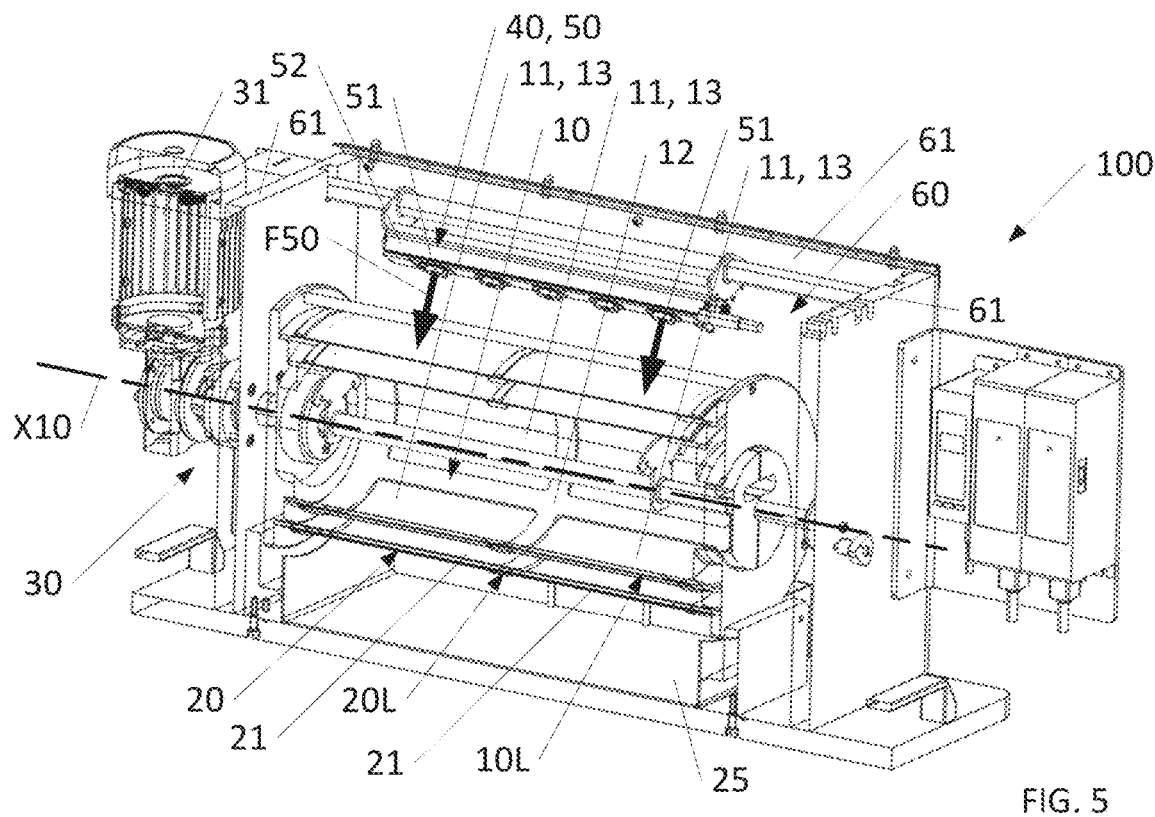
FIG. 5 is a perspective view of the unit of FIGS. 1 to 3, with a longitudinal section in a vertical section plane which is parallel to the axis of rotation of the screening drums.

As can be seen in FIGS. 2 and 5, the receptacle 10 may comprise a perforated rigid framework 12, which will act as a support for meshwork panels 13, in this case curved panels that follow substantially or even exactly the curvature of the side wall 10L of the screening drum, which meshwork panels 13 match the openings in the framework 12 so as to form as many portions of the screen 11.

Figure 6:
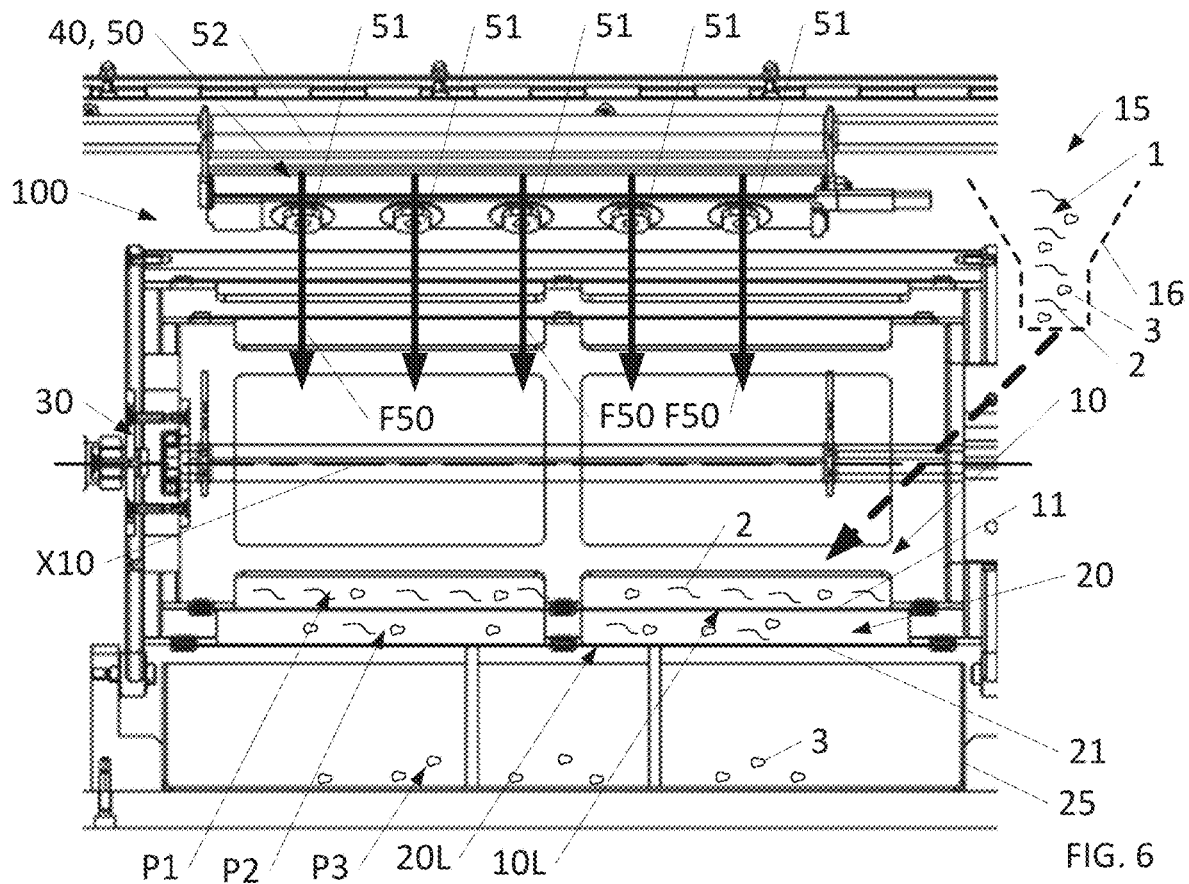
FIG. 6 is a partial side view of the unit of FIGS. 1 to 3, in longitudinal section in a vertical sagittal plane containing the axis of rotation of the screening drums.

The receptacle 10 may be supplied using any suitable feed system 15, for example by means of a worm screw, of Archimedes screw type, which takes the mixture 1 from a neighbouring silo in order to transfer it into the receptacle 10, or by means of a hopper 16 that discharges the mixture 1 into said receptacle 10, as shown schematically in FIGS. 3 and 6.

It could be envisaged supplying and therefore operating the unit 100 in batches, whereby a predetermined, finite quantity of mixture 1 is introduced into the receptacle 10, said quantity being referred to as a "batch", and said batch is fully treated before the unit is emptied and reloaded with a new batch of mixture 1 to start a new separation cycle.

However, as a preferential variant, to improve the industrial yield of the unit 100 by reducing the downtime of said unit, continuous supply could be envisaged, whereby mixture 1 is fed to the receptacle 10 without interruption, for example at one of the axial ends of the screening drum, as the mixture 1 being treated in the receptacle 10 is screened and as the products P1, P2 resulting from the treatment of the mixture are discharged from the receptacle 10, and more generally from the unit 100, for example by collecting said products P1, P2 at the other end of the screening drum and/or on appropriate removal conveyors.

The separation method according to the invention then comprises, following the supply step (S1), a dissociation step (S2) which involves carrying out, simultaneously, an agitation sub-step (S201) in which mechanical mixing of the mixture 1 contained in the receptacle 10 is performed and a neutralization sub-step (S202) in which the mixture 1 being mixed in the receptacle 10 is exposed to bipolar charges in order to neutralize electrostatic charges of the fibers 2 and the granules 3.

Mechanical mixing of the mixture 1 may be obtained by any suitable means, and in particular either, preferably, by setting the receptacle 10 in motion, relative to the frame of the unit 100, for example by rotating the receptacle 10, or, alternatively, by stirring the mixture 1 by means of a mixing member, such as a mixing paddle, which would be immersed in the receptacle 10 and set in motion relative to the receptacle 10.

Preferably, as receptacle 10, use is made of a first cylindrical screening drum 10 delimited by a tubular side wall 10L which extends along and around a central axis X10 forming with the horizontal an angle of less than 30 degrees, at least a portion of said tubular side wall 10L forming the screen 11.

Advantageously, during the agitation sub-step (S201), use may then preferably be made of a rotation R10 of the first screening drum 10 on itself, about its central axis X10, to cause mixing of the mixture 1.

By placing the mixture 1 in a cylindrical screening drum 10 which is lying on its side and by using the rotation R10 of the drum on itself, which rotation R10 is preferably continuous and monotonous, that is to say carried out uninterruptedly and always in a single same direction, effective and gentle agitation of the mixture 1 is advantageously obtained, without jolts and without the risk of compaction of the mixture 1, this being achieved moreover without jerking or vibration of the receptacle 10, or excessive noise, which improves the lifespan, reliability and comfort of use of the unit 100.

The speed of rotation R10 is moderate in such a way that, on the one hand, it allows natural mixing of the mixture 1, by the mixture self-collapsing and constantly turning inward, under the combined action of the rotation R10 (which allows the side wall 10L to take with it and lift a portion of the mixture along said side wall, in the direction of rotation R10, as seen in a section normal to the axis of rotation) and of gravity (which causes this portion of the mixture lifted by the rotation to fall back down onto the rest of the mixture), and, on the other hand, it prevents an effect of centrifugation of the mixture 1, which would tend to compact said mixture 1 instead of breaking it up, or even to eject through the meshes of the screen 11 some clumps of fibers 2 and granules 3 before said clumps have been properly dissociated into separate fibers 2 and granules 3.

Thus, the speed of rotation R10 will preferably be selected, according to the internal diameter of the screening drum 10, such that the centrifugal acceleration experienced by the mixture 1 due to said rotation R10 remains at less than 125 m·s$^{-2}$, i.e. at less than 12.75 times the gravitational acceleration. In practice, for a granule 3 with a mass of the order of 0.15 grams, such an acceleration will generate a centrifugal force of approximately 0.018 newtons on said granule 3.

By way of indication, in particular for a diameter of the screening drum of between 100 mm and 1000 mm, and more particularly between 120 mm and 240 mm, the speed of rotation R10 will preferably be between 10 rpm and 150 rpm, more preferably between 30 rpm and 90 rpm.

Moreover, note that, optionally, the radially inner face of the side wall 10L of the screening drum 10 may be provided with protuberances, such as blades, which help to divide and stir the mixture 1 during the rotation R10.

According to a possible arrangement, at least some of these protuberances will correspond to bumps that the framework 12 forms with respect to the panels 13 of the screen 11.

Preferably, the angle formed by the central axis X10 of the first screening drum 10 with respect to the horizontal is non-zero. By way of indication, said angle may for example be between 5 degrees and 30 degrees.

This makes it possible to give said central axis X10, and therefore the first screening drum 10, an incline that places the inlet of the first screening drum 10, corresponding to the open base of the cylinder located at one of the two axial ends of said first screening drum, considered along the central axis X10, at an altitude higher than the altitude of the outlet of the first screening drum, which for its part corresponds to the open base of the cylinder forming the other, opposite axial end of said first screening drum 10.

Under the combined effect of the rotation R10 and of gravity, this incline of the screening drum 10, and more specifically of the side wall 10L of said screening drum, allows the mixture 1 to be gradually and continuously conveyed from the inlet to the outlet of the first screening drum 10, along the central axis X10, and thus allows continuous operation of the unit 100, with a very low energy consumption.

Note that, when the receptacle 10 is formed by a first screening drum 10, care will be taken to ensure that said first screening drum is not filled over its entire height, i.e. over the entire extent of its cross section, in order to keep an empty space in the upper part of the cylinder that is sufficient to allow the mixture 1 to be effectively stirred during the rotation R10 of the screening drum 10, as well as to be sufficiently exposed to the action of the bipolar charges, and where applicable to the blowing action. By way of indication, the level of filling will be such that the mixture occupies, in the lower part of the cylinder, a height that is less than or equal to 40% of the internal diameter of the first screening drum 10, for example a height of between 25% and 30% of said internal diameter.

In the neutralization sub-step (S202), bipolar charges are produced, that is to say a set of positive ions and negative ions which is neutral overall and which is launched onto the mixture 1, for example by blowing or by gravitation, in order to diffuse said bipolar charges in the mixture 1, and to allow the ions to perform electronic exchange with the fibers 2 which carry electrostatic charges, respectively with the granules 3 which carry electrostatic charges of opposite sign to the sign of the charges of the fibers 2. The electrostatic charges of the components of the mixture 1 may advantageously thus be nullified so that said components can be separated more easily.

To be specific, the inventors have found that the fibers 2 and granules 3 of the untreated mixtures 1 are often electrically charged, in particular as a result of the friction that these fibers and granules have undergone during the operations of shredding, conveying, pouring out, etc., and that, as long as these components carry residual electrostatic charges, it is almost futile to try to dissociate them from one another by simple mechanical action, since the electrostatic forces of attraction between components carrying charges of opposite signs have the effect of causing said components to clump back together almost instantly.

The neutralization proposed in accordance with the invention therefore makes it possible to significantly improve the effective dissociation of the components of the mixture 1.

Preferably, the bipolar charges will be generated, by a neutralization device 40, by ionizing the ambient gaseous atmosphere in the vicinity of the receptacle 10, in this case therefore preferably by ionizing the ambient air surrounding the unit 100.

To obtain this ionization, the neutralization device 40 will preferably use an alternating electric field generator, the frequency of which will preferably be between 50 Hz and 60 Hz, and the amplitude preferably between 3 kV and 7 kV.

The separation method according to the invention then comprises, following the dissociation step (S2), a screening step (S3) during which the mixture 1 treated in accordance with the dissociation step (S2) is passed over the screen 11 in order to retain in the receptacle 10 a first product P1 resulting from the mixture 1, this first product P1 having, as shown schematically in FIGS. 3 and 6, a fiber 2 content greater than that of the mixture 1, while a second product P2 resulting from the mixture 1 is discharged through the screen 11, the granule 3 content of this second product P2 being greater than that of the mixture 1.

Indeed, note that the fibers 2 tend to become intertangled and positioned across the openings of the meshes of the screen 11, which prevents them from passing through said screen 11.

Note also that the screening may preferably be carried out in practice in the same place as, and therefore almost at the same time as, the dissociation step (S2), in that the screen 11 is in a region of the space which is subjected both to mechanical mixing causing agitation and to ionic bombardment performing neutralization. Thus, as soon as they are dissociated, the fibers 2 and granules 3 are directly exposed to the action of the screen 11, without having had the time or the opportunity to clump back together.

Preferably, the first cylindrical drum 10 will have an axial length greater than its internal diameter, for example at least 1.5 times greater, preferably at least 2 times greater, or even at least 4 times greater or at least 5 times greater than its internal diameter. This will make it possible in particular to accommodate a large amount of mixture 1 within the receptacle 10 while effectively distributing the mixture 1 over a large surface area of the screen 11, in a layer that is relatively thin and therefore easy to agitate and neutralize.

The screen 11 fitted to the side wall 10L of the first cylindrical screening drum 10 will advantageously form an annular structure around the central axis X10, and will typically cover, in one same section normal to the central axis X10, and where applicable considering the entirety of the various meshwork panels 13 arranged around the central axis X10 in the section in question, a total angular coverage at least equal to 240 degrees or even at least 270 degrees around the central axis X10 (in other words at least two thirds, preferably at least three quarters, of the circumference of the side wall 10L consist of one or more meshworks 13 of the screen 11), preferably at least equal to 300 degrees, or even at least equal to 330 degrees.

Advantageously, this will make it possible to always have a portion of the screen 11 engaged with the mixture 1, in the lower area of the first screening drum 10.

The size of the mesh of the screen 11 will of course be defined in such a way as to be able to ensure segregation of one of the components (in this case the fibers 2) from the other component (in this case the granules 3).

By way of indication, the mesh of the screen 11 will preferably be between 2 mm and 6 mm.

Note that the rotation R10 of the first screening drum 10 promotes the action of the screen 11, by allowing the mixture 1 to slide constantly in contact with the meshes of the screen 11.

Naturally, collectors could be provided to collect the first product P1 on the one hand and, separately, the second product P2 on the other hand.

In particular, a first collector could be provided in the downstream extension of the first screening drum 10, facing the lower axial end of said first screening drum 10, in order to collect the first product P1, in this case enriched in fibers 2 compared to the original mixture 1, as the continuous production of said first product P1 progresses.

Note that, by convention, the "contents" of fibers 2, respectively of granules 3, in the original mixture 1, and in the products P1, P2, will preferably correspond to the proportion by weight of the component in question (fiber or granule) in the mixture 1 or in the product P1, P2 in question.

Preferably, the dissociation step (S2) comprises, simultaneously with the agitation sub-step (S201) and neutralization sub-step (S202), a blowing sub-step (S203), in which the mixture 1 contained in the receptacle 10 is subjected to a forced gas flow F50, preferably a forced air flow, which on the one hand contributes to the mechanical mixing and the aeration of said mixture 1, and on the other hand promotes the supply and the dissipation of the bipolar charges within said mixture 1.

The blowing action advantageously enhances the effectiveness of the agitation action and the neutralization action, and therefore ultimately the dissociation action. Thus, the three modes of action engaged jointly in accordance with the invention, namely mechanical mixing, electrostatic neutralization and blowing, combine in perfect synergy to optimize dissociation.

Note in particular that blowing makes it possible to obtain, mechanically, aeration of the mixture 1, that is to say a reduction in the compaction of the mixture by the creation of gaps, filled with blown gas, in this case filled with air, between the components of the mixture, and also contributes to the movement of the components of the mixture relative to one another, which makes it possible to keep the fibers 2 separated from the granules 3.

The gas flow F50 also makes it possible to convey the bipolar charges to the mixture 1 then to facilitate the diffusion of said charges within the aerated mixture 1, which ensures a relatively homogeneous, and in-depth, neutralization of said mixture 1.

To this end, the gas flow F50 will preferably be directed toward the lower half of the first screening drum 10, and especially toward the lower portion of the side wall 10L, in the area where the mixture 1 being treated is located and where mixing and screening take place in particular.

Preferably, with the screening step (S3) described above forming a first screening step, the separation method according to the invention comprises a second screening step (S4), during which, as can be seen in particular in FIGS. 3 and 6, the second product P2 is screened by means of a second screening drum 20 which has a diameter greater than the first screening drum 10 in such a way as to form a second tubular wall 20L which surrounds said first screening drum 10 at a radial distance from the tubular side wall 10L of said first screening drum 10, and which forms a second screen 21 the mesh of which is finer than that of the first screen 11 used in the first screening step (S3), such that a third product P3 is discharged through the second screen 21, the granule 3 content of which is greater than that of the second product P2.

A third product P3 that is particularly well refined may thus advantageously be obtained, by means of a unit 100 which is still particularly compact.

By way of indication, the mesh of the second screen 21 could preferably be less than 4 mm, or even less than 2 mm, and for example between 1 mm and 4 mm, or even between 1 mm and 2 mm.

Preferably, the second tubular wall 20L is coaxial with the first screening drum 10. More generally, the second screening drum 20 is therefore preferably coaxial with the first screening drum 10.

Advantageously, as the first and second screening drums 10, 20 are lying on their side, preferably substantially horizontal, and more preferably inclined to ensure conveying of the mixture 1 and the products P1, P2 retained by the screens 11, 21, and as said first and second screening drums 10, 20 overlap axially, the components of the mixture 1, in this case mainly the granules 3, may successively pass through the first screen 11 then the second screen 21 naturally, by gravity, in a generally radial direction relative to the central axis X10.

The third product P3 thus falls naturally into a third collector 25 (or conveyor) placed under the second screening drum 20, while the second product P2, or at least what remains of the second product P2 in the second screening drum 20 after discharge of the third product P3 through the second screen 21, may be collected by a second collector (or conveyor) located at the downstream axial end of the second screening drum 20, and distinct from the first collector (or conveyor) which collects the first product P1 leaving the first screening drum 10, such that the first product P1 and the second product P2 do not mix.

According to a possible variant of implementation of the method, it will be possible to recover any second product P2 retained in the second screening drum 20, and reintroduce said second product P2 at the inlet of the first screening drum 10 so as to subject it to a new separation cycle, in order to typically recover, upon this second passage through the first screening drum 10, the fibers 2 let through by said first screening drum 10 during the first step (S3) of screening the initial mixture 1.

Preferably, the second product P2 located in the second screening drum 20 will also, like the first product P1 and the mixture 1 contained in the first screening drum 10, be subjected to an agitation action and to a neutralization action.

Preferably, the second screening drum 20 will for this purpose be rotated, preferably rotated synchronously with, and more preferably rotated as one with, the rotation R10 of the first screening drum 10.

Likewise, the second screening drum 20 will preferably be located in the area of influence of the bipolar charges, and even more preferably in the path of the gas flow F50 ensuring the blowing action.

The dissociation of the fibers 2 and the granules 3, initiated in the first screening drum 10, will thus be continued and carried out also within the second screening drum 20.

Although the second screening drum 20 has a diameter strictly greater than the first screening drum 10, in order to contain the latter, the arrangement of said second screening drum 20 may preferably be similar to that of the first screening drum 10, as regards one, several, or even all of the features described above, and may therefore be deduced mutatis mutandis from the arrangement of the first screening drum 10.

Preferably, the receptacle 10, in this case therefore the first screening drum 10, is located inside a chamber 60 which is delimited by walls 61.

Said chamber 60, which makes it possible to separate the functional members of the unit from the exterior of the unit, advantageously contains the receptacle(s) 10, in this case the first and the second screening drum 10, 20, their respective screens 11, 21, and the neutralization 40 and blowing 50 devices, in this case in the form of ionizing blower bars 52.

The method may then advantageously comprise a step (S5) of recovering fibers 2 during which one and/or other of the walls 61 of the chamber 60 is scraped, for example by means of a scraper or a brush, in order to recover fibers 2 of the mixture 1 which have been projected out of the receptacle 10, or more generally out of one or other of the first and second screening drums 10, 20, by the forced gas flow F50, and which have remained attached to said walls 61.

The inventors in fact found that the forced gas flow F50, and the movements induced by said gas flow in the relatively confined atmosphere of the chamber 60, had the effect of conveying to the walls 61 of the chamber, in particular to the vertical walls 61, fibers 2 from the mixture 1, and that these fibers 2 accumulated, by spontaneous adhesion to the inner faces of said walls 61, to form a fourth product, with a downy appearance, distinct from the first, second and third products P1, P2, P3, and of very high purity, that is to say consisting almost exclusively, or even exclusively, of fibers 2, and therefore almost devoid of granules 3, or even completely devoid of granules 3, such that it was particularly beneficial to recover this fourth product.

Naturally, the invention also relates as such to a separation unit 100 which is intended to receive a mixture of fibers 2 and granules 3 in order to separate said fibers 2 from said granules 3.

Said unit 100 comprises a receptacle 10 which is arranged to receive the mixture 1 and which is provided with a screen 11, an agitation device 30 which makes it possible to mix the mixture 1 contained in the receptacle 10, a neutralization device 40 designed to emit bipolar charges intended for the mixture 1 while said mixture 1 is being mixed in the receptacle 10, in order to be able to neutralize electrostatic charges of the fibers 2 and the granules 3, the agitation device 30 and the neutralization device 40 being arranged to act jointly on the mixture 1 in such a way as to be able to dissociate clumps of fibers 2 and granules 3 and thus facilitate the screening of the mixture 1 by the screen 11.

Preferably, the agitation device 30 is designed to drive the screen 11, and more generally the receptacle 10, in movement.

Preferably, as described in detail above, the receptacle 10 is formed by a first cylindrical screening drum 10 which is delimited by a tubular side wall 10L which extends along and around a central axis X10 forming with the horizontal an angle of less than 30 degrees, and preferably non-zero, at least a portion of said tubular side wall 10L forming the screen 11.

Preferably, the agitation device 30 may then be designed to drive said first screening drum 10 in rotation R10 on itself, about its central axis X10, in order to cause mixing of the mixture 1.

Whatever the form of the agitator used to cause mixing of the mixture 1, and in particular if said mixing results from setting the receptacle 10 in motion, more particularly from setting the first screening drum 10 in rotation R10, the agitation device 30 may be equipped with a mixing motor 31, preferably an electric motor, to drive the moving part(s) responsible for the mixing, in this case typically to drive the first screening drum 10 in rotation.

Advantageously, the movement of the receptacle 10, and more particularly the rotation R10 of the screening drum 10, makes it possible not only to mix the mixture 1 to dissociate it, but also to generate a relative movement between said mixture 1 and the screen 11, in order to generate the screening action.

Preferably, the unit 100 comprises a blowing device 50 arranged to generate a forced gas flow F50, preferably a forced air flow, and to direct said gas flow F50 onto the mixture 1 subjected to the joint action of the agitation device 30 and the neutralization device 40, such that said gas flow F50 on the one hand contributes to the mixing of the mixture 1 and to aeration of said mixture, and on the other hand promotes the supply and the dissipation of the bipolar charges within said mixture 1.

The gas flow F50 may take the form of an air curtain, or of one or more jets emanating from as many nozzles 51, as can be seen in FIG. 6.

The flow rate of the gas flow F50 will be chosen to be sufficiently high such that the power of said incident flow effectively produces a blowing effect on the components of the mixture, and in particular such that the gas flow 50 is sufficiently powerful to be able to drive and agitate the fibers 2, and to detach said fibers 2 from the granules 3.

The blowing action will thus provide a second mechanical mixing component, in addition to the first mechanical mixing component which is provided by the setting in motion, in this case by the setting in rotation R10, of the receptacle 10.

Preferably, the unit 100 comprises at least one ionizing blower module 52, and preferably several ionizing blower modules 52, which each combine within the same subassembly, for example in the form of an ionizing blower bar 52, both a blowing device 50 and a neutralization device 40.

Advantageously, such ionizing blower bars are compact, directly commercially available, and particularly simple to maintain or replace.

According to a possible arrangement, and as shown in FIGS. 1 and 3, it is possible to arrange an ionizing blower module 52, in this case an ionizing blower bar oriented lengthwise parallel to the central axis X10, and more preferably two ionizing blower modules 52, in this case two ionizing blower bars parallel to one another and to the central axis X10, outside the first screening drum 10, and more preferably outside the assembly formed by the first and second screening drums 10, 20.

Said ionizing blower modules 52 will preferably be arranged higher than the central axis X10, or above the crest line of the radially outermost screening drum 10, 20 (in practice, in this case the second screening drum 20 in a configuration with two nested screening drums 10, 20).

A height adjustment system may also be provided, making it possible to adjust the height of one or other of the ionizing blower modules 52, in order to be able to optimize the action of said modules.

Preferably, said ionizing blower modules 52 will be arranged symmetrically to one another with respect to the vertical sagittal plane which contains the central axis X10.

The respective gas flows F50 generated by said ionizing blower modules 52, which convey the bipolar charges, will be directed at the screening drum or drums 10, 20, preferably such that the initial directions of the gas flows F50 are transverse to the central axis X10, and therefore not parallel to said central axis X10, so that the gas flows interact efficiently with the mixture 1.

According to another possible arrangement, shown in FIG. 4, one or more ionizing blower modules 52, where appropriate all of the ionizing blower modules 52 fitted to the unit 100, are installed inside the first screening drum 10, and oriented in such a way as to direct their gas flow F50 and their bipolar charge flow toward the lower portion of said first screening drum 10.

Said ionizing blower modules 52 will of course be arranged above the filling level reached by the mixture 1 within the first screening drum 10.

More specifically, these gas flows F50 will be directed in such a way as to substantially cover an imaginary surface which is parallel to the central axis X10 and which is located at a height between ¼ and ½ of the internal diameter relative to the bottom line of the side wall 10L forming the bottom of the screening drum 10. Thus, said gas flows F50 will substantially cover the entire surface of the mixture 1 contained in said receptacle 10.

In this regard, note that the fact that there are two ionizing blower modules 52, each pointing in a substantially opposite direction, makes it possible to cover a large surface area by means of the gas flows F50.

Positioning ionizing blower modules 52, and more particularly ionizing blower bars, inside the first screening drum 10 advantageously affords a compact arrangement, as well as proximity between the source of the bipolar charges and the mixture 1, which improves the interaction of the bipolar charges with the mixture 1, notably so as to carry out the first dissociation of said mixture 1.

If, on the contrary, ionizing blower modules 52, and more particularly ionizing blower bars, are placed outside the first screening drum 10, and more generally outside the assembly of the first and second screening drums 10, 20, as can be seen in FIG. 3, then the flow of bipolar charges may advantageously cover more easily, and simultaneously, the two screening drums 10, 20, and in particular the space between the first screening drum 10 and the second screening drum 20.

In particular, when the unit 100 comprises a chamber 60 forming part of the fixed frame of said unit 100, which chamber 60 is delimited by walls 61 and which contains the receptacle(s) 10, in this case the first and the second screening drum 10, 20, their respective screens 11, 21, and the neutralization 40 and blowing 50 devices, in this case the ionizing blower bars 52, then placing ionizing blower bars 52 outside the screening drum(s) 10, 20 will facilitate, by a vortex effect, the diffusion of the bipolar charges substantially throughout the internal volume of said chamber 60.

According to a possible embodiment, a set of ionizing blower bars 52 external to the second screening drum 20 and a set of ionizing blower bars 52 internal to the first screening drum 10 may be combined within the unit 100, in order to combine the aforementioned advantages.

Preferably, the unit 100 comprises a second cylindrical screening drum 20, of diameter greater than that of the first screening drum 10, said second screening drum 20 surrounding the first screening drum 10, preferably arranged coaxially with said first screening drum 10, in order to form around said first screening drum 10 a second receptacle 20 delimited by the tubular side wall 20L of the second screening drum, which side wall 20L of the second screening drum comprises a second screen 21 the mesh of which is finer than the mesh of the screen 11 of the first screening drum 10.

Said second screening drum 20 is also rotated about its central axis. This rotation could be different, and in particular have an angular speed different from that of the first screening drum 10, which would make it possible to generate, in particular between the two screening drums 10, 20, additional mixing, which would improve screening. However, the two screening drums 10, 20 are preferably rotated as one, in the same direction and at the same angular speed, which makes it possible in particular to simplify the structure of the unit 100 by providing a rotation support and/or or a drive system which are common to the two screening drums 10, 20.

Preferably, one same mixing motor 31, common to the two screening drums 10, 20, will be used.

Just like the first screening drum 10, the second screening drum 20 will preferably have a central axis which is inclined, in the same direction as the central axis X10 of the first screening drum 10, and preferably coincident with the central axis X10 of the first screening drum 10, in order to continuously convey the second product P2 toward the outlet, located lower than the inlet, of said second screening drum 20.

Of course, the invention is by no means limited to the sole embodiments described above, with a person skilled in the art notably being capable of isolating or of freely combining any of the aforementioned features, or of replacing them with equivalents.

What is claimed is:

1. A separation method making it possible, from a mixture containing fibers and granules, to separate said fibers from said granules, said method comprising:
   a supply step, during which the mixture is brought into a receptacle provided with a screen,
   a dissociation step which involves carrying out an agitation sub-step in which mechanical mixing of the mixture contained in the receptacle is performed and simultaneously a neutralization sub-step in which the mixture being mixed in the receptacle is exposed to bipolar charges in order to neutralize electrostatic charges of the fibers and the granules,
   a screening step during which the mixture treated in accordance with the dissociation step is passed over the screen in order to retain in the receptacle a first product resulting from the mixture, the first product having a fiber content greater than that of the mixture, while a second product resulting from the mixture is discharged through the screen, the granule content of the second product being greater than that of the mixture.

2. The method as claimed in claim 1, wherein the dissociation step comprises, simultaneously with the agitation sub-step and neutralization sub-step, a blowing sub-step, in which the mixture contained in the receptacle is subjected to a forced gas flow, which contributes to the mechanical mixing and the aeration of said mixture, and promotes the supply and the dissipation of the bipolar charges within said mixture.

3. The method as claimed in claim 2, wherein the receptacle is located inside a chamber which is delimited by walls, and further comprising
   recovering fibers which have been projected out of the receptacle by the forced gas flow.

4. The method as claimed in claim 2, wherein the forced gas flow is a forced air flow.

5. The method as claimed in claim 1, wherein as the receptacle, use is made of a first cylindrical screening drum delimited by a tubular side wall which extends along and around a central axis forming with the horizontal an angle of less than 30 degrees, at least a portion of said tubular side wall forming the screen, and
   during the agitation sub-step, use is made of a rotation of the first screening drum on itself, about its central axis, to cause mixing of the mixture.

6. The method as claimed in claim 5, further including a second screening step, during which the second product is screened by a second screening drum which has a diameter greater than the first screening drum in such a way as to form a second tubular wall, which second tubular wall surrounds said first screening drum at a radial distance from the tubular side wall of said first screening drum, and forms a second screen the mesh of which is finer than that of the first screen used in the first screening step, such that a third product is discharged through the second screen, the granule content of which is greater than that of the second product.

7. The method as claimed in claim 6, wherein the second tubular wall is coaxial with the first screening drum.

8. The method as claimed in claim 1, wherein the method is applied to a mixture which contains textile fibers, and granules made of a rubber-based material.

9. The method as claimed in claim 8, wherein the textile fibers are made of polyethylene terephthalate.

10. A method for recycling a pneumatic tire comprising:
- a grinding step, during which at least a portion of said pneumatic tire is reduced to a mixture containing textile fibres and granules made of a rubber-based material, and
- a sorting step, during which a separation method as claimed in claim 1 is applied to said mixture.

11. A separation unit intended to receive a mixture of fibers and granules in order to separate said fibers from said granules, said unit comprising:
- a receptacle which is arranged to receive the mixture and which is provided with a screen,
- an agitation device which makes it possible to mix the mixture contained in the receptacle,
- a neutralization device designed to emit bipolar charges intended for the mixture while said mixture is being mixed in the receptacle, in order to be able to neutralize electrostatic charges of the fibers and the granules,
- the agitation device and the neutralization device being arranged to act jointly on the mixture in such a way as to be able to dissociate clumps of fibers and granules and thus facilitate the screening of the mixture by the screen.

12. The unit as claimed in claim 11, including a blowing device arranged to generate a forced gas flow and to direct said gas flow onto the mixture subjected to the joint action of the agitation device and the neutralization device, such that said gas flow on the one hand contributes to the mixing of the mixture and to aeration of said mixture, and on the other hand promotes the supply and the dissipation of the bipolar charges within said mixture.

13. The unit as claimed in claim 12, including at least one ionizing blower module which each combine within the same sub-assembly, both a blowing device and a neutralization device.

14. The unit as claimed in claim 13, wherein one or more ionizing blower modules are installed inside the first screening drum, and oriented in such a way as to direct their gas flow and their bipolar charge flow toward the lower portion of said screening drum.

15. The unit as claimed in claim 13, wherein the at least one ionizing blower module includes several ionizing blower modules.

16. The unit as claimed in claim 12, wherein the forced gas flow is a forced air flow.

17. The unit as claimed in claim 11, wherein the receptacle is formed by a first cylindrical screening drum which is delimited by a tubular side wall which extends along and around a central axis forming with the horizontal an angle of less than 30 degrees, at least a portion of said tubular side wall forming the screen, and the agitation device is designed to drive said first screening drum in rotation on itself, about its central axis, in order to cause mixing of the mixture.

18. The unit as claimed in claim 17, including a second cylindrical screening drum, of diameter greater than that of the first screening drum, said second screening drum surrounding the first screening drum, in order to form around said first screening drum a second receptacle delimited by the tubular side wall of the second screening drum, which side wall of the second screening drum comprises a second screen the mesh of which is finer than that of the screen of the first screening drum.

19. The unit as claimed in claim 18, wherein the second screening drum is arranged coaxially with the first screening drum.

20. The unit as claimed in claim 17, wherein angle is non zero.

* * * * *